(12) United States Patent
Kim et al.

(10) Patent No.: US 9,108,492 B2
(45) Date of Patent: Aug. 18, 2015

(54) APPARATUS AND METHOD FOR BLOCKING INCIDENT RAYS FROM ENTERING AN INTERIOR CABIN OF VEHICLE

(75) Inventors: Sung Un Kim, Gyeonggi-do (KR); Gi Beom Hong, Gyeonggi-do (KR); Kwang Myung Oh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 24 days.

(21) Appl. No.: 13/554,007

(22) Filed: Jul. 20, 2012

(65) Prior Publication Data

US 2013/0146234 A1  Jun. 13, 2013

(30) Foreign Application Priority Data

Dec. 7, 2011 (KR) .................. 10-2011-0129961

(51) Int. Cl.
*G06F 7/00* (2006.01)
*B60J 3/02* (2006.01)

(52) U.S. Cl.
CPC .................... *B60J 3/0243* (2013.01)

(58) Field of Classification Search
CPC .................. G06F 3/017; B60J 3/0243
USPC .............. 701/36; 160/127; 382/103
See application file for complete search history.

(56) References Cited

U.S. PATENT DOCUMENTS

| | | | | |
|---|---|---|---|---|
| 4,902,062 A * | 2/1990 | Pusic et al. | ............ | 296/97.4 |
| 7,199,767 B2 * | 4/2007 | Spero | ............ | 345/7 |
| 7,275,778 B2 * | 10/2007 | Asai | ............ | 296/97.11 |
| 7,690,712 B2 * | 4/2010 | Mitsui | ............ | 296/97.2 |
| 2005/0063564 A1 * | 3/2005 | Yamamoto et al. | ............ | 382/104 |
| 2009/0046538 A1 * | 2/2009 | Breed et al. | ............ | 367/93 |
| 2010/0094501 A1 * | 4/2010 | Kwok | ............ | 701/36 |

FOREIGN PATENT DOCUMENTS

| | | |
|---|---|---|
| JP | 2008-189253 A | 8/2008 |
| JP | 2009078651 A | 4/2009 |
| KR | 10-2006-0072268 | 6/2006 |
| KR | 10-2010-0011069 | 2/2010 |
| KR | 1020110112182 A | 10/2012 |

* cited by examiner

*Primary Examiner* — Calvin Cheung
*Assistant Examiner* — Paula L Schneider
(74) *Attorney, Agent, or Firm* — Mintz Levin Cohn Ferris Glovsky and Popeo, P.C.; Peter F. Corless

(57) ABSTRACT

Disclosed is an apparatus for blocking incident rays from entering an interior cabin of a vehicle. More specifically, an imaging device provided at a predetermined position in the vehicle and photographing an area around a driver's hands and eyes when a driver raises his or her hand to block rays in the direction of a driver's seat. A control unit which receives photographs from the imaging device, acquires an extension line which extends from the eye area to the hand area. A ray blocking mechanism installed in the vehicle accordingly is then controlled and accordingly operated to block the point where the extension line and the windshield glass or the side glass of the driver's seat meet each other.

12 Claims, 3 Drawing Sheets

APPARATUS AND METHOD FOR BLOCKING INCIDENT RAYS FROM ENTERING AN INTERIOR CABIN OF VEHICLE

CROSS-REFERENCE TO RELATED APPLICATION

This application claims under 35 U.S.C. §119(a) the benefit of Korean Patent Application No. 10-2011-0129961 filed on Dec. 7, 2011, the entire contents of which are incorporated herein by reference.

BACKGROUND (a) Technical Field

The present invention relates to an apparatus and a method for blocking incident rays to the inside of a vehicle configured to block or weaken incident rays by measuring a driver's hand operation to block rays and incident points of the rays when rays are incident to the inside of the vehicle.

(b) Background Art

Generally, when a significant amount of direct sunlight enters a windshield or driver's seat side glass of a vehicle, a driver can become temporarily blinded or sun struck due to the large amount of sunlight hitting his or her eyes.

Further, a similar problem may occur when beams of headlights of a vehicle are being driven within an opposite lane of traffic if approaching the vehicle. This has particularly become a problem in recent years as vehicle manufactures have begun adopting headlamps with a high degree of luminance.

One common solution is a sun visor. A sun visor is a mechanical device which is configured to block sunlight or light in general which is incident in the driver's seat and a passenger's seat inside the vehicle. Sun visors, however, require the driver to take his or her hands off the wheel and manually raise or lower the sun visor while the driver is driving the vehicle to block the light entering the vehicle and thus is often thought to be inconvenient. Additionally, sun visors also block the driver's visibility as well as the light and thus reduce the visible area through which the driver can see through the windshield or the side glass.

One solution for the manual operation problems of the conventional sun visor is a sun visor that automatically adjusts itself to block rays according to the intensity of rays and a type of rays as shown in FIG. 1. This technology requires a driving motor 8, a ray sensing means 20 mounted on windshield glass 6 or a rear surface of a review minor to sense light rays, a motor controlling unit 30 controlling the motor 8 to rotate forward/backward according to a sensing signal by the ray sensing means 20, and a sun visor 10 mounted in/on panel 2 of a vehicle body to slide vertically on a guide rail (not shown) by the forward/backward rotation of the motor 8.

However, since the automatic sun visor shown in FIG. 1 uses only the ray sensing means attached to the windshield glass or the rear surface of the room mirror, the height of the sun visor is uniformly controlled according to the quantity of incident rays which are incident in a front area of a driver.

Therefore, the quantity of incident rays measured by the ray sensing means may be different from a reference amount of incident rays required to drive the sun visor under a predetermined driving condition (for example, on an uphill road or a downhill road), thereby orientating the sun visor in a direction which is not actually blocking the light rays in this instance.

Matters described as the background art are just to improve the background of the present invention, but it should not be understood that the matters correspond to the related art which has been already known to those skilled in the art.

SUMMARY OF THE DISCLOSURE

The present invention has been made in an effort to provide an apparatus and a method for blocking incident rays to the inside of a vehicle configured to block incident rays by measuring driver's hand operation to block rays and incident points of the rays when rays are incident to an interior of a vehicle cabin.

An exemplary embodiment of the present invention provides an apparatus for blocking incident rays an interior of a vehicle cabin, including: an imaging device provided at a predetermined position in the vehicle. The imaging device photographs an area around a driver's eyes and hand when a driver raises a hand to block rays incident in a driver's seat. A control unit receives photographs from the imaging device related to the areas around the driver's eyes and hand, and calculates an extension line which extends from the area around the driver's eyes to the area around the driver's hand. The extension line is acquired by deducing 3D positional coordinate values of the photographed hand area and eye area, 3D positional coordinate values of the windshield glass and a side glass of a driver's seat that are stored in advance, and a point where an end portion of the extension line meets the windshield glass or the side glass of the driver's seat. A ray blocking mechanism installed in the vehicle to receive an operating signal from the control unit, operates to block the point where the extension line and the windshield glass or the side glass of the driver's seat meet each other when the operating signal is inputted block or weaken light rays incident in the driver's seat.

The control unit may measure illuminance or luminance of the rays incident in the hand area and a face area and when a difference in the illuminance or luminance of the rays is equal to or greater than a reference value, an operating signal may be applied to the ray blocking mechanism.

The ray blocking mechanism may be embodied as a sun visor driven by an electric device or a liquid crystal glass which is electrically controlled.

Another exemplary embodiment of the present invention provides a method for blocking incident rays to the inside of a vehicle, including: storing 3D positional coordinate values of windshield glass and a driver's seat side glass in a memory of a control unit; photographing a hand area and an eye area of a driver in a imaging device when the driver raises his/her hand in order to block rays incident in a driver's seat; calculating an extension line which connects an image of the driver's eye to an image of the driver's hand by deducing 3D positional coordinate values of the hand area and the eye area photographed by the imaging device and acquiring a point where an end portion of the extension line meets the windshield glass or the driver's seat side glass; and blocking or weakening the rays incident in the driver's seat by blocking the point where the extension line meets the windshield glass or the driver's seat side glass via a ray blocking mechanism.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
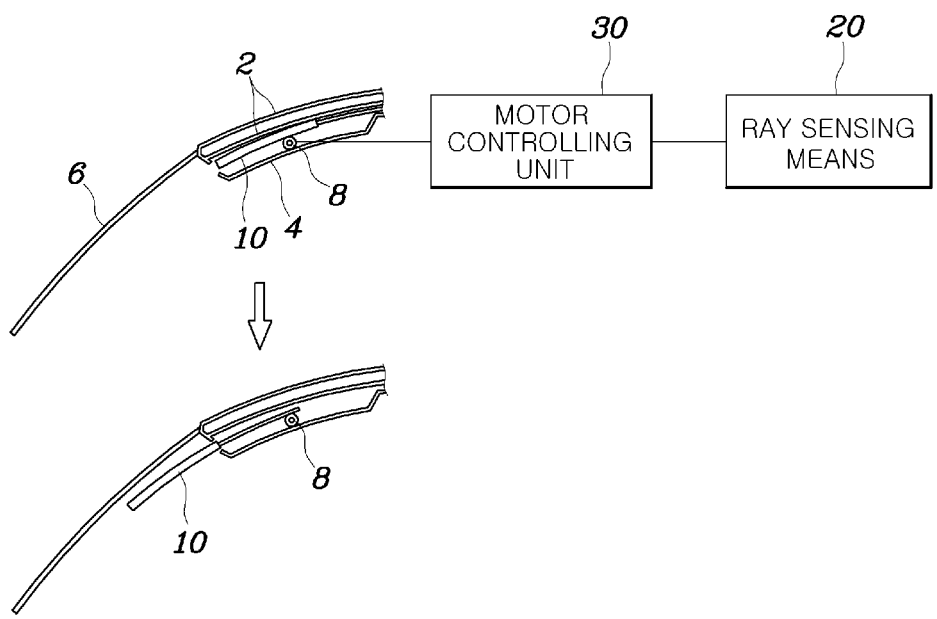
FIG. 1 is a diagram showing a sun visor driving apparatus in the related art.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

Exemplary embodiments of the present invention will be described below with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 2:
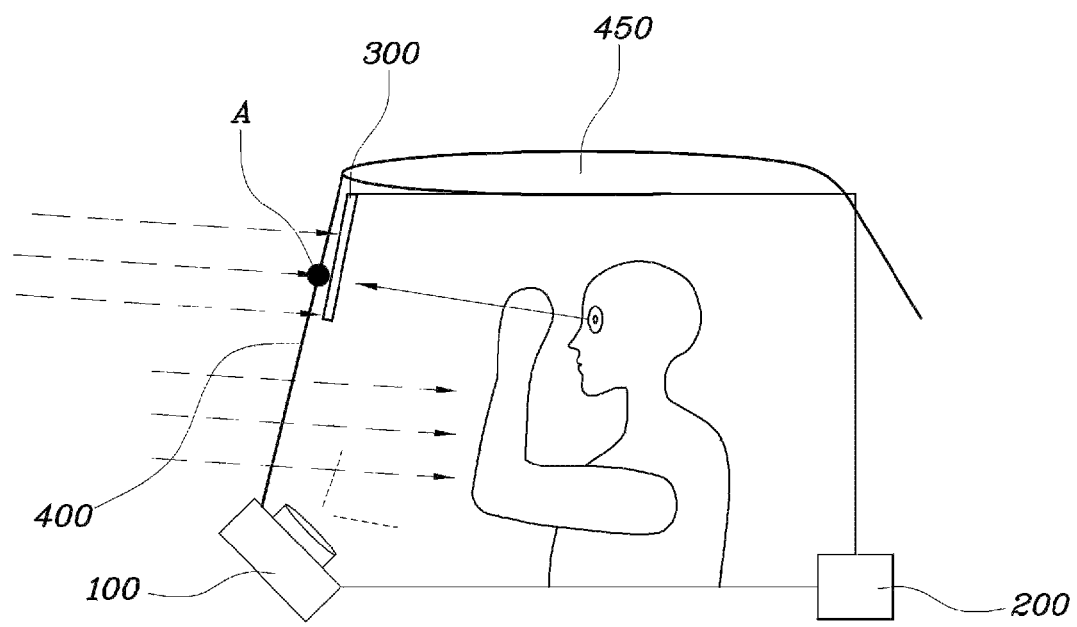
FIG. 2 is a diagram schematically diagram showing an overall configuration of an apparatus for blocking and controlling incident rays to the inside of a vehicle according to an exemplary embodiment of the present invention.
Figure 3:
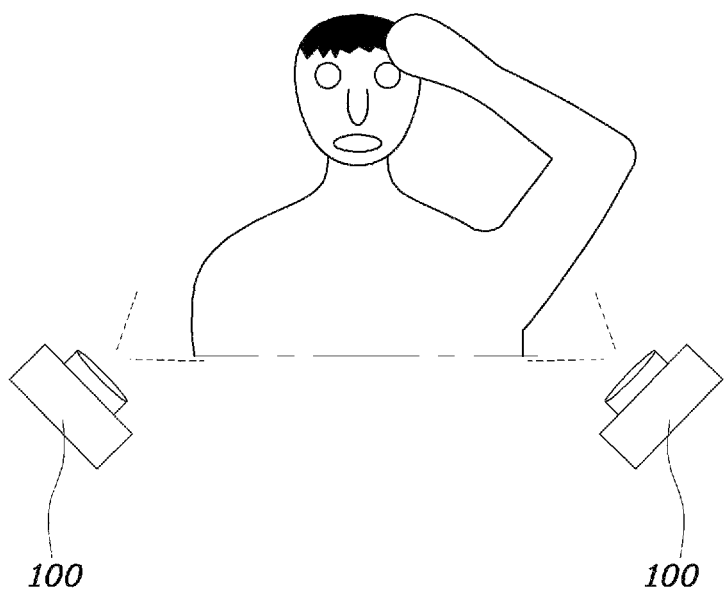
FIG. 3 is a schematic diagram showing FIG. 2 viewed from the front side.

An apparatus for blocking incident rays to the inside of a vehicle according to an exemplary embodiment of the present invention shown in FIGS. 2 and 3 includes an imaging device (e.g., camera) 100 provided at a predetermined position in the vehicle. The imaging device is configured photograph an area around a driver's hand and eyes respectively when a driver raises a hand to block light rays incident in a driver's seat. A control unit 200 receives the photographs from the imaging device 100 and calculates an extension line which extends from the eye area to the hand area. The extension line is calculated by deducing 3D positional coordinate values of the photographed hand area and eye area. 3D positional coordinate values of the windshield glass 400 and a side glass (reference numeral not shown) of a driver's seat are stored in advance, and a point A where an end portion of the extension line meets the windshield glass 400 or the side glass of the driver's seat is acquired.

A ray blocking mechanism 300 installed in the vehicle receives an operating signal from the control unit 200, and is operated to block the point A where the extension line and the windshield glass 400 or the side glass of the driver's seat meet each other when the operating signal is inputted.

As stated above, the imaging device 100 photographs both the eye area of the driver and the hand area raised in order to block the rays. The imaging device may be installed in front area of the cabin of a vehicle and should be installed at a place where the hand area and the eye area can be easily photographed without any obstructions and further, a photographing point is appropriately set toward a driver's face based on the driver raising his or her hand to block incident light rays.

The imaging device 100 may be a stereo camera or a 3D camera for photographing a stereoscopic photo and in this case, two or more may be installed depending on a type of the imaging device 100, and as a result, an error between the 3D positional coordinate values of the hand area and the eye area can be reduced by the control unit 200. In addition, the control unit 200 may be an electronic control unit (ECU) installed in the vehicle.

According to the above configuration, when the rays are incident in the driver who is sitting in the driver's seat, an angle and the point (A) where the rays are incident are calculated by the control unit 200 based on the gesture (i.e., hand raising) which the driver performs in order to block the rays. Therefore, the rays incident are blocked via the ray blocking mechanism 300 to conveniently block and weaken the rays incident in the driver's seat.

In the exemplary embodiment of the present invention, the control unit 200 measures illuminance or luminance of the rays incident in the hand area and a face area and when a difference in the illuminance or luminance of the rays is equal to or greater than a reference value, an operating signal may be applied to the ray blocking mechanism 300. That is, the driver may raise his/her hands to his/her own face while driving the vehicle due to various causes in addition to blocking the light rays and thus, this element of the illustrative embodiment of the present invention prevents the system from erroneously operating the ray blocking mechanism.

Therefore, when the driver raises the hand in order to block the rays, the intensity of the rays which shine unto the hand area and the intensity of the rays which shine in the eye area are each different. In particular, the illuminance or luminance of the rays which shine to in the hand area is greater than the illuminance or luminance of the rays which shine in the eye area. In this case, the difference in intensity of the rays may be the difference in illuminance or the difference in luminance and both two differences may be adopted. Accordingly, the ray blocking mechanism 300 may operate only when the driver blocks the rays to improve the reliability and merchantability of the apparatus.

Moreover, the ray blocking mechanism 300 may be a sun visor driven by an electric device. In this case, the sun visor is automatically driven by an electric device such as a motor upon receiving the operating signal from the control unit 200 and may be installed a roof panel 450 positioned above the driver's seat. Since the configuration of the sun visor is well know to those skilled in the art, a detailed description of the configuration will be omitted.

Further, the ray blocking mechanism 300 may be liquid crystal glass which is electrically controlled. That is, in the liquid crystal glass, when electricity is interrupted, the liquid crystal molecules are scattered to block the rays, and as a result, the liquid crystal glass becomes opaque. However, when electricity is supplied to the liquid crystal glass, the liquid crystal molecules have constant directionality, such that the liquid crystal glass becomes transparent glass. The liquid crystal glass may be installed on the roof panel 450 positioned above the driver's seat to protrude downward or the liquid crystal glass may be mounted on the top of the windshield glass 400.

An operation and an effect of the present invention will be described through FIG. 2.

A method for blocking and controlling incident rays to the inside of a vehicle according to another exemplary embodiment of the present invention includes a glass position storing process of previously storing 3D positional coordinate values of windshield glass 400 and a driver's seat side glass in a control unit 200. An image photographing process photographs an area around a driver's hand and eyes by a imaging device 100 when the driver raises his/her hand to block light rays incident in a driver's seat; an incident point deducing process of acquiring an extension line which connects an eye to a hand by calculating 3D positional coordinate values of the hand area and the eye area photographed by the imaging device 100 and acquiring a point A where an end portion of the extension line meets the windshield glass 400 or the driver's seat side glass. A ray blocking and controlling process blocks or weakens the light rays incident in the driver's seat by blocking the point A where the extension line meets the windshield glass 400 or the driver's seat side glass by using a ray blocking mechanism 300. That is, when the rays are incident in the driver's seat of the vehicle, in particular, the eye area of the driver, the driver blocks the rays by raising his/her hand in a direction in which the rays are incident.

Therefore, the imaging device 100 photographs the hand area and the eye area of the driver and transmits the photographed hand area and the eye area to the control unit 200 and the control unit 200 analyzes images of the hand area and the eye area photographed by the imaging device 100 to acquire the 3D positional coordinate values of the hand area and the eye area.

Subsequently, the extension line which is linked from the eye area to the hand area is acquired and a point A of the windshield glass 400 or the driver's seat side glass which meets the end portion of the extension line linearly is deduced.

With this, the control unit 200 applies the operating signal to the ray blocking mechanism 300, and as a result, the ray blocking mechanism 300 operates accordingly. In this case, the ray blocking mechanism 300 is operated to include and block the point A where the end portion of the extension line at least meets the windshield glass 400 or the driver's seat side glass to block the point A of the driver's seat in which the rays are incident.

Advantageously, the light rays incident in the eye area of the driver can be accurately blocked by using positional information of the hand which the driver initially uses to block the rays and the rays incident in the driver's seat can be easily and conveniently blocked through a simple operation.

According to the exemplary embodiments of the present invention, a driver can conveniently block or weaken light rays incident in a driver's seat by performing a simple operation of blocking rays to improve reliability and merchantability of the apparatus and further, the driver immediately blocks the light rays by a simple hand operation without finding and operating an additional buttons or directly operating the sun visor while driving to more safely drive the vehicle. Further, by using positional information of a hand for to the driver to block the rays, an incident direction and an incident point of a ray incident in the driver's seat is recognized by the system, and as a result, light rays incident in a driver's eye area can be accurately blocked.

Although the above exemplary embodiment is described as using a single control unit to perform the above process, it is understood that the above processes may also be performed by a plurality of control units.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. An apparatus for blocking incident rays to the inside of a vehicle, comprising:
    a imaging device provided at a predetermined position in the vehicle and configured to photograph an area around a driver's hand and an area around the driver's eyes when a driver raises the hand to block light rays incident to a driver's seat;
    a control unit configured to:
        receive the photographs of the area around the driver's eyes and hand in response to the driver raising the hand to block rays incident to the driver's seat,
        acquire an extension line which extends from the eye area to the hand area is acquired by deducing 3D positional coordinate values of the photographed hand area and eye area,
        store in advance 3D positional coordinate values of the windshield glass and a side glass of a driver's seat, and acquire a point where an end portion of the extension line meets the windshield glass or the side glass of the driver's seat based on the 3D positional coordinate values stored in advance and the acquired extension line; and
    a ray blocking mechanism installed in the vehicle and configured to receive an operating signal from the control unit, and block, in response to the driver raising the hand to block light rays incident to the driver's seat, the point where the extension line and the windshield glass or the side glass of the driver's seat meet each other when the operating signal is inputted.

2. The apparatus for blocking incident rays to the inside of a vehicle of claim 1, wherein the control unit measures illuminance or luminance of the rays incident in the hand area and a face area and when a difference in the illuminance or luminance of the rays is equal to or greater than a reference value, an operating signal is applied to the ray blocking mechanism.

3. The apparatus for blocking incident rays to the inside of a vehicle of claim 1, wherein the ray blocking mechanism is a sun visor driven by an electric device.

4. The apparatus for blocking incident rays to the inside of a vehicle of claim 1, wherein the ray blocking mechanism is liquid crystal glass which is electrically controlled.

5. A method for blocking incident rays to the inside of a vehicle, comprising:
    storing, on a memory within a control unit, 3D positional coordinate values of windshield glass and a driver's seat side glass in a control unit;
    photographing, by an imaging device, a hand area and an eye area of a driver when the driver raises a hand to block light rays incident in a driver's seat;
    acquiring, by the control unit, an extension line which connects an eye to a hand in the photograph by deducing 3D positional coordinate values of the hand area and the eye area photographed by the imaging device and acquire a point where an end portion of the extension line meets the windshield glass or the driver's seat side glass; and in response to the driver raided the hand to block light rays incident to the driver's seat, blocking or weakening the rays incident in the driver's seat by blocking the point where the extension line meets the windshield glass or the driver's seat side glass via a ray blocking mechanism.

6. The method of claim 5, further comprising measuring illuminance or luminance of the light rays incident in the hand area and a face area and when a difference in the illuminance or luminance of the rays is equal to or greater than a reference value, applying an operating signal to the ray blocking mechanism.

7. The method of claim 5, wherein the ray blocking mechanism is a sun visor driven by an electric device.

8. The method of claim 5, wherein the ray blocking mechanism is liquid crystal glass which is electrically controlled.

9. A non-transitory computer readable medium containing program instructions executed by a control unit, the computer readable medium comprising:

program instructions that store 3D positional coordinate values of windshield glass and a driver's seat side glass in a control unit;

program instructions that control an imaging device to photograph a hand area and an eye area of a driver when the driver raises a hand to block light rays incident in a driver's seat;

program instructions that acquire an extension line which connects an eye to a hand in the photograph by deducing 3D positional coordinate values of the hand area and the eye area photographed by the imaging device;

program instructions that acquire a point where an end portion of the extension line meets the windshield glass or the driver's seat side glass; and program instructions that in response to determining that the driver raised the hand to block light rays incident to the driver's seat, apply an operating signal to a ray blocking mechanism to block light rays incident in the driver's seat at a point where the extension line meets the windshield glass or the driver's seat side glass.

10. The non-transitory computer readable medium of claim 9, further comprising program instructions that measure illuminance or luminance of the light rays incident in the hand area and a face area and when a difference in the illuminance or luminance of the rays is equal to or greater than a reference value, applying an operating signal to the ray blocking mechanism.

11. The non-transitory computer readable medium of claim 9, wherein the ray blocking mechanism is a sun visor driven by an electric device.

12. The non-transitory computer readable medium of claim 9, wherein the ray blocking mechanism is liquid crystal glass which is electrically controlled.

* * * * *